United States Patent [19]

Isaacson et al.

[11] Patent Number: 5,316,381

[45] Date of Patent: May 31, 1994

[54] TENSIONING AND SUSPENSION SYSTEM FOR A TRACKED VEHICLE

[75] Inventors: Charles D. Isaacson, Colona; Dale H. Killen, Green Rock, both of Ill.; James A. Nagorcka, Vic., Australia

[73] Assignee: Deere & Company, Moline, Ill.

[21] Appl. No.: 976,090

[22] Filed: Nov. 13, 1992

[51] Int. Cl.⁵ ............................................. B62D 55/30
[52] U.S. Cl. ....................................... 305/10; 305/25; 305/29
[58] Field of Search .................. 305/10, 21, 22, 24, 305/25, 28, 29, 31, 32

[56] References Cited

U.S. PATENT DOCUMENTS

| | | |
|---|---|---|
| 2,887,342 | 5/1959 | Helsel . |
| 2,926,969 | 3/1960 | Ashley et al. . |
| 2,998,998 | 9/1961 | Hyler et al. . |
| 3,310,127 | 3/1967 | Siber et al. ............... 305/10 X |
| 3,774,708 | 11/1973 | Purcell et al. ............ 305/25 X |
| 3,901,563 | 8/1975 | Day . |
| 4,149,757 | 4/1979 | Meisel, Jr. ................. 305/10 |
| 4,227,748 | 10/1980 | Meisel . |
| 4,373,758 | 2/1983 | Livesay . |
| 4,519,654 | 5/1985 | Satzler . |
| 4,840,437 | 6/1989 | Henry et al. ............... 305/10 |
| 4,893,883 | 1/1990 | Satzler ...................... 305/10 |
| 5,005,920 | 4/1991 | Kinsinger ................... 305/10 |

FOREIGN PATENT DOCUMENTS 0882811 11/1981 U.S.S.R. ................... 305/10

*Primary Examiner*—Russell D. Stormer

[57] ABSTRACT

The invention is directed to a hydraulic tensioning and suspension system having a main drive wheel located above and between two idlers that are mounted to pivot arms that are coupled to a rigid frame. In addition, two track rollers are mounted to the rigid frame by an intermediate arm and a third track roller is mounted to the front pivot arm by an additional pivot arm. Four hydraulic suspension cylinders are hydraulically coupled to one another for biasing the idlers and track rollers downwardly to provide a suspension system. The rear pivot arm is a telescoping arm having a hydraulic tensioning cylinder. A two position control valve supplies hydraulic fluid to the hydraulic tensioning cylinder in response to a speed ratio selected by the operator. With higher tension being applied to the track when the vehicle transmission is in low gear and lower tension is being applied to the track when the vehicle transmission is in higher gears.

5 Claims, 4 Drawing Sheets

TENSIONING AND SUSPENSION SYSTEM FOR A TRACKED VEHICLE

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

1. Field of the Invention

The invention is directed to a hydraulic tensioning and suspension system for a tracked vehicle.

2. Description of the Prior Art

Tracks provide vehicles with high floatation in soft field conditions. Steel tracks are by far the most common tracks and comprise an endless chain on which track shoes are mounted. The endless chain engages a main drive wheel sprocket which drives the chain and propels the tracks and vehicle. Belted tracks are also available. One belted track system uses highly tensioned belted tracks. In another belted track system, the tracks are provided with apertures. The apertures engage a main drive sprocket wheel for driving the tracks and propelling the vehicle. A third belted track system uses a specialized main drive wheel to engage centering guide lugs for driving the track.

Tracks must be tensioned so they remain on the drive wheels and idlers. Screw jacks (See U.S. Pat. No. 2,926,969), grease cylinders (See U.S. Pat. No. 2,887,342), and hydraulic tensioning cylinders (See U.S. Pat. Nos. 2,998,998, 3,901,563 and 4,227,748) have been used to tension tracks.

Various suspension systems for crawlers have also been developed. Track rollers help distribute the load of the vehicle on the track. In a rigid suspension system, the track rollers are directly mounted to the track frame. Loads imparted to the track rollers are directly transferred to the track frame. In an active suspension system, the track frame is provided with a means for dampening the loads imparted to the track rollers (See U.S. Pat. No. 4,373,758 and 4,519,654).

High drive crawlers having an elevated main drive wheel are well known (See U.S. Pat. No. 4,373,758). In addition track technology has been applied to all sorts of agricultural vehicles. For example tractors, grain carts and agricultural combines. It is common for combines used in harvesting rice to use half tracks to provide better floatation.

SUMMARY OF THE INVENTION

It is an object of the present invention to provide a track tensioning and suspension system that is easily retrofitted to existing wheeled machines.

It is another object of the present invention to provide a track tensioning system having a high and low tension mode that is controlled by the speed range selected by the operator.

In the present tensioning and suspension system a rigid frame is mounted to the chassis of a vehicle. A front pivot arm is pivotally mounted to the rigid frame together with a rear pivot arm. The front and rear pivot arms are provided with front and rear hydraulic suspension cylinders, respectively, for biassing the pivot arms downwardly. The end of each pivot arm is provided with a rotatable idler. A main drive wheel is located above and between the idlers. A track surrounds the main drive wheel and idlers. Two track rollers are mounted to the main frame through an intermediate pivot arm that is pivotally coupled to the rigid frame. An intermediate hydraulic suspension cylinder biases the intermediate pivot arm downwardly. A third track roller is rotatable mounted to an additional pivot arm that is pivotally mounted to the front pivot arm. An additional hydraulic suspension cylinder is mounted between the front pivot arm and the additional arm biassing the additional arm downwardly. The four hydraulic suspension cylinders are in fluid communication with one another and an accumulator. The accumulator provides a constant source of pressure to the hydraulic suspension cylinders.

The rear pivot arm is a telescoping arm that can be extended and retracted to tension the track. A hydraulic tensioning cylinder is used to extend and retract the track. The tensioning cylinder is hydraulically coupled to the hydrostatic pump which is used to drive the main drive wheel. Therefore, as additional torque is required to drive the vehicle the tensioning pressure increases linearly. A two-position solenoid control valve is hydraulically positioned between the tensioning cylinder and the pump. This valve controls whether the hydraulic tensioning cylinder is operated in a high tension mode or a low tension mode. It has been found that the tracks need to be more highly tension when driving the vehicle at a low gear setting than at a high gear setting. Therefore when the vehicle is in first gear the control valve is placed in its first position. In this position the control valve directs hydraulic fluid from the hydrostatic pump to the open side of the tensioning cylinder. The piston rod side of the tensioning cylinder is coupled to the hydraulic reservoir when the control valve is in its first position. When the control valve is in its second position both sides of the tensioning cylinder is coupled to the hydrostatic pump. This results in low tension because both sides of the piston work against one another except for the cross sectional area defined by the missing piston rod on the open side of the cylinder.

DESCRIPTION OF THE PREFERRED EMBODIMENT

Figure 1:
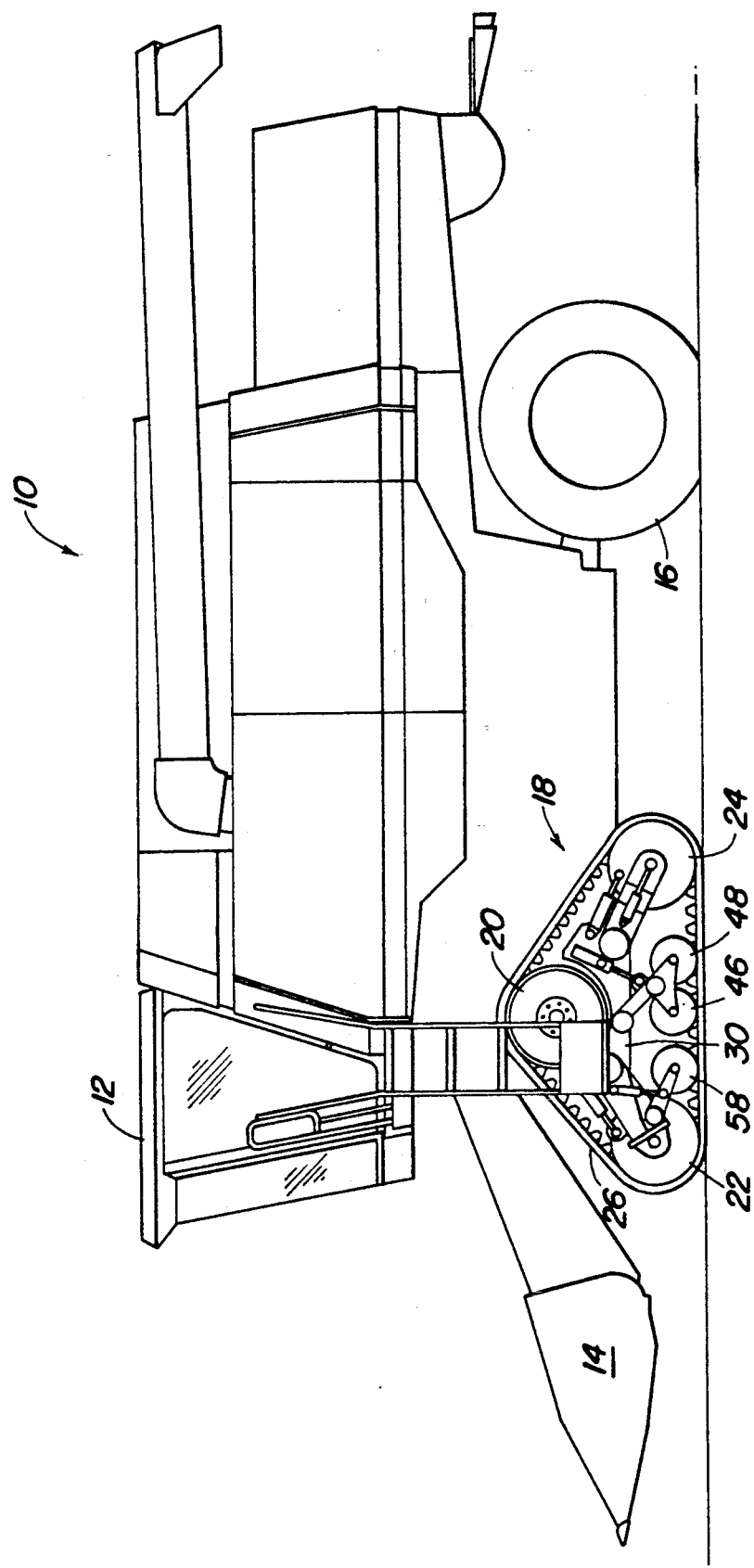
FIG. 1 is a side view of an agricultural combine having a half track.

FIG. 1 is a side view of an agricultural combine 10 having an operator's cab 12, a harvesting platform 14, rear steering wheel 16, and half track propulsion assembly 18. The present invention is described as being a half track propulsion assembly for a combine, for which it is particularly well suited, however the present invention may be used on a variety of tracked vehicles and should only be limited by the claims that follow.

Figure 2:
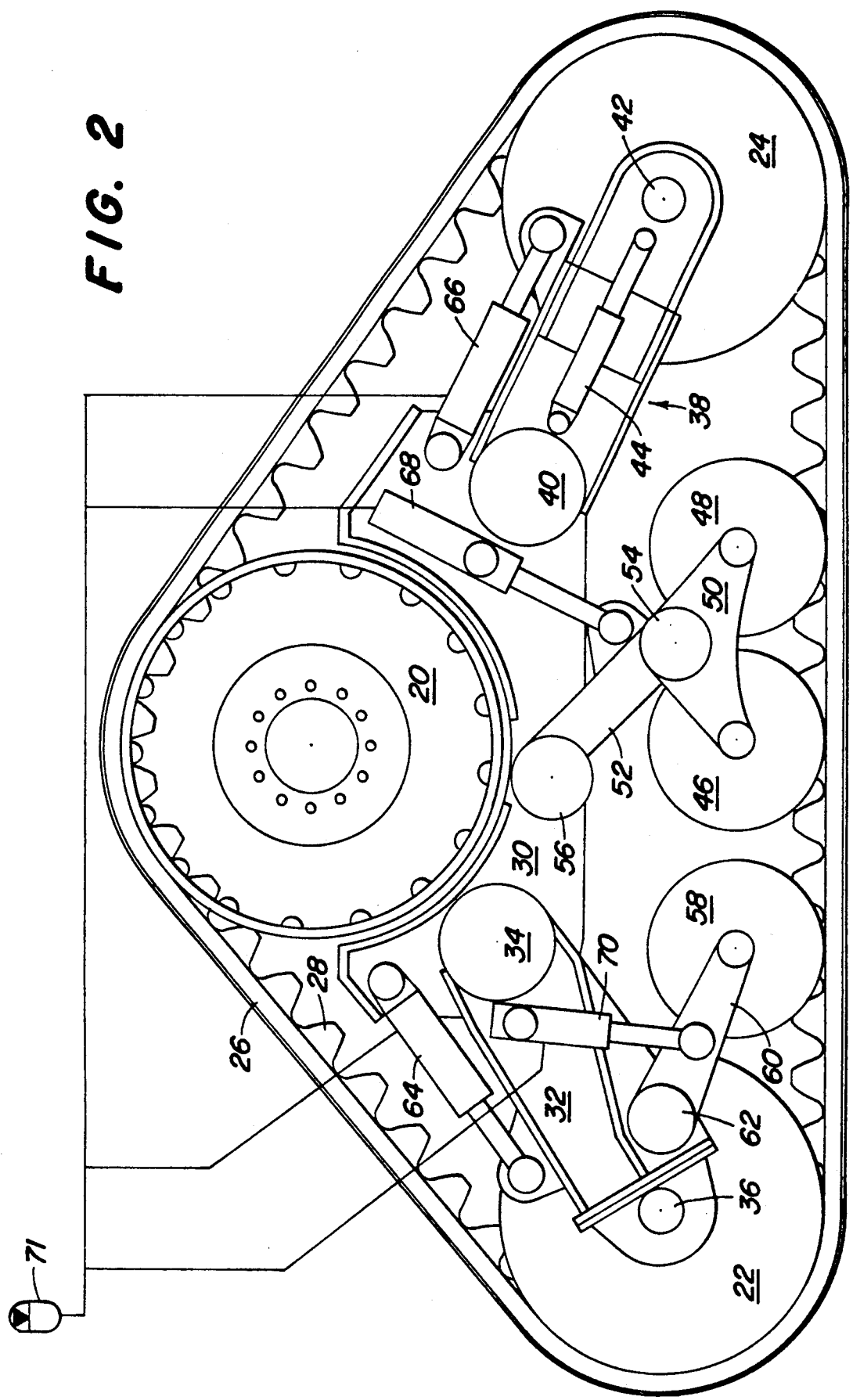
FIG. 2 is an enlarged side view of the half track including a hydraulic schematic of the suspension system.

The track propulsion assembly is best illustrated in FIG. 2. The propulsion assembly comprises a main drive wheel 20, front idler 22, and rear idler 24. A track 26 surrounds the idlers and the main drive wheel. The track is provided with centering guide lugs that are engaged by the main drive wheel for driving the track and thereby the combine.

A rigid frame 30 is bolted to the axle housing of the combine chassis and is used for supporting the tensioning and suspension system of the track propulsion assembly. The front idler 22 is pivotally coupled to the rigid frame 30 by front pivot arm 32. One end of front pivot arm 32 is pivotally coupled to the rigid frame by front pivot 34. The front idler 22 is rotatably mounted to the other end of the front pivot arm 32. The front idler defining a front idler axis 36.

The rear idler 24 is rotatably mounted to the rigid frame 30 by rear pivot arm 38. One end of rear pivot arm 38 is pivotally coupled to rigid frame 30 by rear pivot 40. Rear idler 24 is rotatably mounted to the other end of rear pivot arm 38 and defines a rear idler axis 42. The rear pivot arm is a telescoping arm and is provided with a tensioning hydraulic cylinder 44, which will be discussed in greater detail later. In addition, the telescoping arm may be provided with a recoil spring, not shown.

Track rollers 46 and 48 are rotatably mounted to track roller mounting member 50. The track roller mounting member 50 is pivotally coupled to intermediate pivot arm 52 by pivot 54. The other end of intermediate arm 52 is pivotally coupled to rigid frame 30 by intermediate pivot 56.

A third track roller 58 is rotatably coupled to additional pivot arm 60. The other end of additional pivot arm 60 is pivotally coupled to front pivot arm 32 by pivot 62.

The suspension comprises four hydraulic suspension cylinders. These cylinders are front hydraulic suspension cylinder 64, rear hydraulic suspension cylinder 66, intermediate hydraulic suspension cylinder 68, and additional hydraulic suspension cylinder 70. All of these hydraulic suspension cylinders are hydraulically coupled to one another and a hydraulic accumulator 71. The front hydraulic suspension cylinder 64 is coupled to the rigid frame 30 and front pivot arm 32. This hydraulic suspension cylinder biases front pivot arm 32 downwardly. Similarly, rear hydraulic suspension cylinder 66 is coupled to rigid frame 30 and rear pivot arm 38 to bias it downwardly. Intermediate hydraulic suspension cylinder 68 is mounted between rigid frame 30 and intermediate pivot arm 52 for biasing this pivot arm downwardly. Lastly, additional hydraulic suspension cylinder 70 is coupled to front pivot arm 32 and additional pivot arm 60 for biasing additional pivot arm 60 downwardly.

Figure 6:
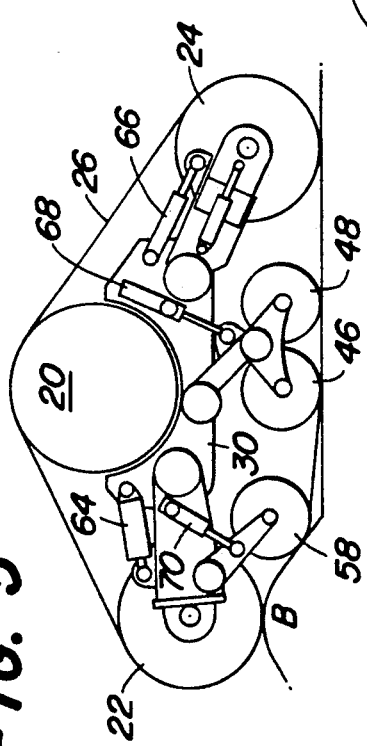
Figure 7:
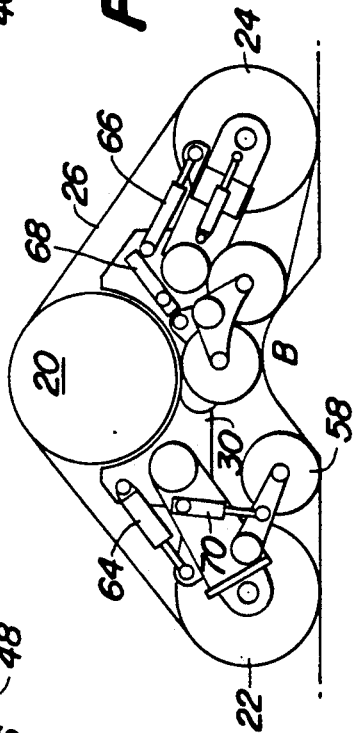
Figure 9:
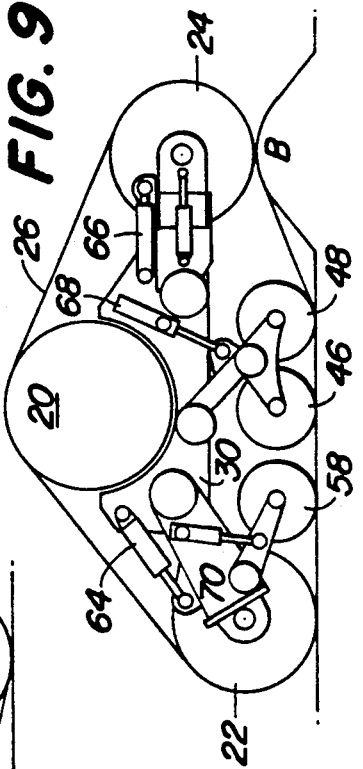
Figure 8:
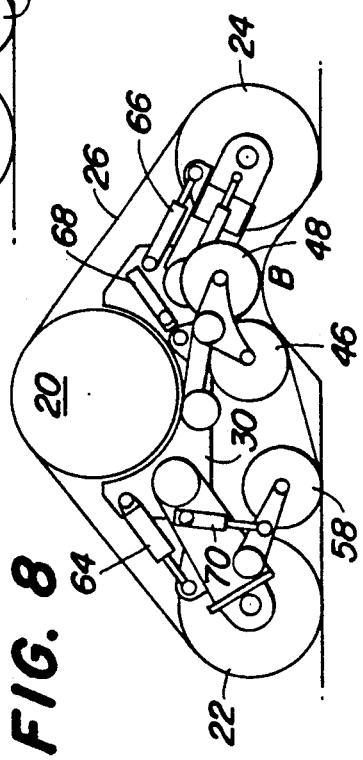

All of the hydraulic suspension cylinders act as shock absorbers to dampen loads being applied to the rigid frame. As illustrated in FIGS. 5-9, when front idler 22 encounters a bump B hydraulic front suspension cylinder 64 is retracted driving hydraulic fluid into the hydraulic accumulator. As the combine moves over the bump, as illustrated in FIG. 6, additional hydraulic suspension cylinder 70 is retracted and front hydraulic suspension cylinder 64 expanded. Much of the fluid from the contracting additional hydraulic suspension cylinder is pumped to the expanding front hydraulic suspension cylinder. This repeats itself for contracting intermediate hydraulic suspension cylinder 68 in FIG. 7, for contracting rear hydraulic suspension cylinder 66 in FIG. 9.

Figure 3:
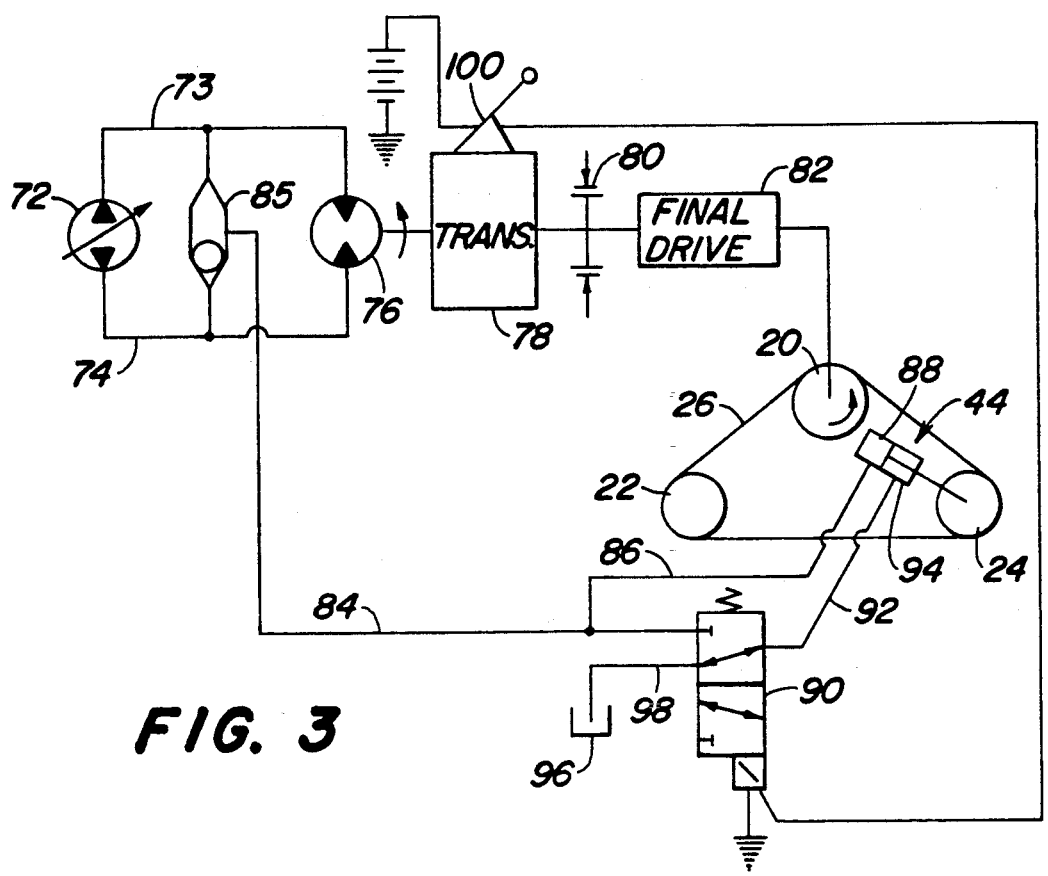
FIG. 3 is a hydraulic schematic of the track tensioning system.

The propulsion system for the tracks is schematically illustrated in FIG. 3. The propulsion system comprises a hydrostatic pump 72 that directs fluid through hydraulic lines 73 and 74 to hydraulic motor 76. Hydraulic motor 76 drives a three speed transmission 78. The output of transmission 78 passes through manual brake 80 to planetary final drive 82. The planetary final drive 82 drives main drive wheel 20 which in turn drives track 26. Hydraulic line 84 is coupled to hydraulic lines 73 and 74 via shuttle valve 85. Shuttle valve 85 directs fluid from line 73 or 74 (whichever line having higher pressure) into line 84. Hydraulic line 84 directs hydraulic fluid to hydraulic branch line 86 which is coupled to open side 88 of hydraulic tensioning cylinder 44. Hydraulic line 84 also directs hydraulic fluid to control valve 90 which is hydraulically coupled through line 92 with the piston rod side 94 of hydraulic tensioning cylinder 44. The valve is also connected to a hydraulic fluid reservoir 96 through hydraulic line 98.

Control valve 90 is a two position solenoid valve. In its unenergized position illustrated in FIG. 3 the piston rod side 94 of hydraulic tensioning cylinder 44 is coupled to hydraulic reservoir 96 through hydraulic lines 92 and 98. This is the high tension mode as all the hydraulic pressure is being applied to the open side 88 of the hydraulic tensioning cylinder. In the present example the high tension mode is used when the operator has shifted the transmission into first gear.

If the operator shifts control lever 100 of transmission 78 from first to second gear, a switch in the control lever is closed energizing the solenoid of control valve 90. Energizing the solenoid shifts the control valve so that the piston rod side of 94 of hydraulic tensioning cylinder 44 is coupled to the hydraulic pressure through hydraulic lines 84 and 92. In this hydraulic configuration hydraulic pressure is applied to both sides of the piston, however; the forces are not completely balanced because hydraulic pressure cannot be applied to the complete piston on the piston rod side 94 of the cylinder because of the piston rod. This results in the low tension mode of operation for the higher gear settings.

Figure 4:
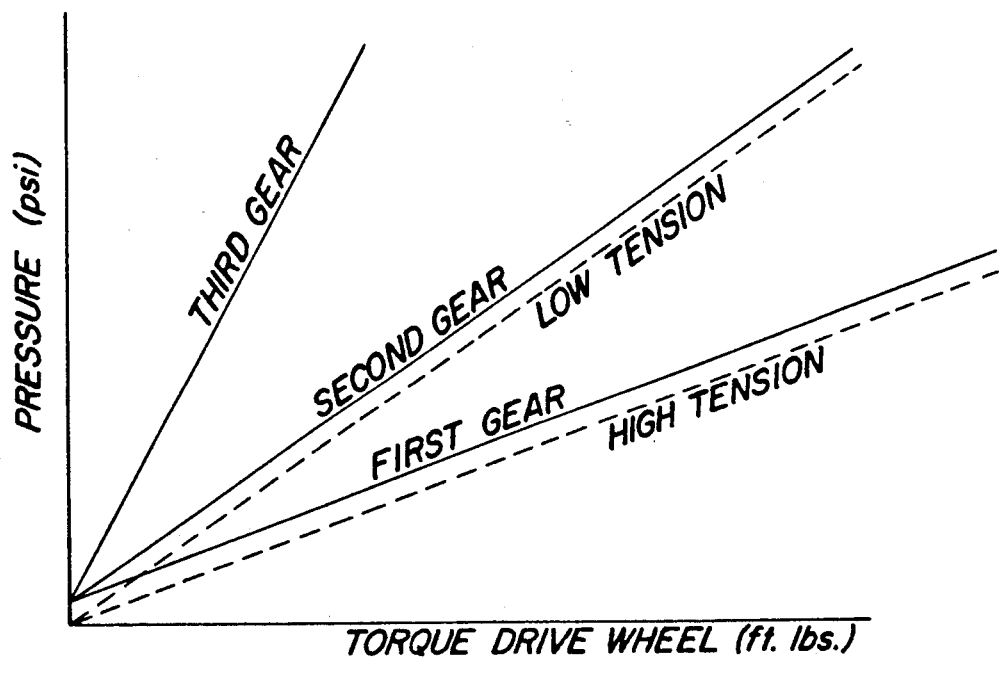
FIG. 4 is a graph of how the tensioning system operates.
Figure 5:
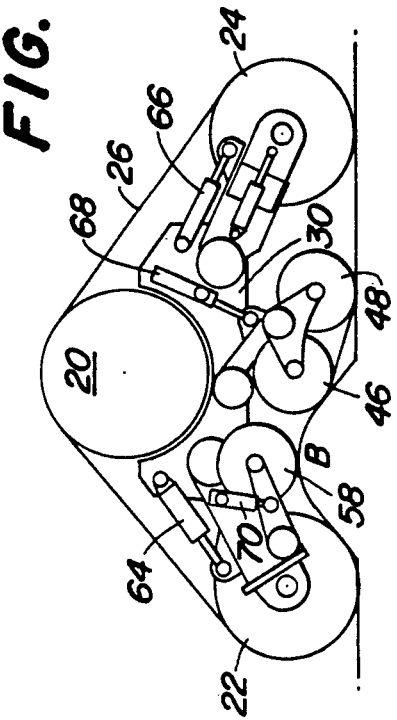
FIGS. 5-9 is a side view of the half track passing over a bump.

FIG. 4 is a graphical presentation of this tensioning system. As illustrated, the high tension mode is used for first gear and the low tension mode is used for second and third gears.

The present invention should not be limited by the above described embodiments but should be limited solely by the claims that follow.

We claim:

1. An undercarriage for a tracked vehicle comprising:
   a rigid frame;
   a main drive wheel mounted to and extending outward from the rigid frame, the main drive wheel having a main drive wheel axis;
   a front pivot arm is pivotally coupled to the rigid frame;
   a front idler is rotatably coupled to the front pivot arm, the front idler having a front idler axis;
   a front hydraulic suspension cylinder is mounted between the rigid frame and the front pivot arm for biasing the front pivot arm downwardly;

a rear pivot arm is pivotally coupled to the rigid frame, the rear pivot arm is a telescoping arm that can be extended and retracted, the telescoping arm is provided with a tensioning hydraulic cylinder for extending telescoping arm;

a rear idler is rotatably coupled to the rear pivot arm, the rear idler having a rear idler axis;

a rear hydraulic suspension cylinder is mounted between the rigid frame and the rear pivot arm for biassing the rear pivot arm downwardly;

an intermediate pivot arm pivotally mounted to the rigid frame, the intermediate arm is located between the front and rear pivot arms, the intermediate arm is provided with a track roller mounting member pivotally coupled to the intermediate pivot arm, the track roller mounting member is provided with two track rollers which are rotatably mounted to the track roller mounting member;

an intermediate hydraulic suspension cylinder is mounted between the rigid frame and the intermediate arm for biassing the intermediate arm downwardly;

a track surrounds the main drive wheel, the front idler and the rear idler, and is engaged by the two track rollers of the intermediate arm, the main drive wheel axis is located above and between the front idler axis and the rear idler axis, the rear pivot arm is extended to tension the track.

2. An undercarriage as defined by claim 1 wherein the front pivot arm is provided with an additional pivot arm which is pivotally coupled to the front pivot arm and which is provided with a rotatable track roller.

3. An undercarriage as defined by claim 2 further comprising an additional hydraulic suspension cylinder that is mounted between the front pivot arm and the additional pivot arm for biassing the additional arm downwardly.

4. An undercarriage as defined by claim 3 wherein the front, rear, intermediate and additional hydraulic suspension cylinders are in fluid communication with one another and a hydraulic accumulator.

5. An undercarriage for a tracked vehicle comprising:
a rigid frame;
a main drive wheel mounted to and extending outward from the rigid frame, the main drive wheel having a main drive wheel axis;
a front pivot arm is pivotally coupled to the rigid frame, the front pivot arm is provided with an additional pivot arm which is pivotally coupled to the front pivot arm and which is provided with a rotatable track roller;
a front idler is rotatably coupled to the front pivot arm, the front idler having a front idler axis;
a front hydraulic suspension cylinder is mounted between the rigid frame and the front pivot arm for biassing the front pivot arm downwardly;
an additional hydraulic suspension cylinder that is mounted between the front pivot arm and the additional pivot arm for biassing the additional arm downwardly;
a rear pivot arm is pivotally coupled to the rigid frame, the rear pivot arm is a telescoping arm that can be extended and retracted, the telescoping arm is provided with a tensioning hydraulic cylinder for extending telescoping arm;
a rear idler is rotatably coupled to the rear pivot arm, the rear idler having a rear idler axis;
a rear hydraulic suspension cylinder is mounted between the rigid frame and the rear pivot arm for biassing the rear pivot arm downwardly;
a track surrounds the main drive wheel, the front idler and the rear idler, the main drive wheel axis is located above and between the front idler axis and the rear idler axis, the rear pivot arm is extended to tension the track.

* * * * *